May 21, 1968   O. C. ECKEL   3,384,199
ACOUSTICAL CONTROL APPARATUS
Filed Aug. 13, 1965
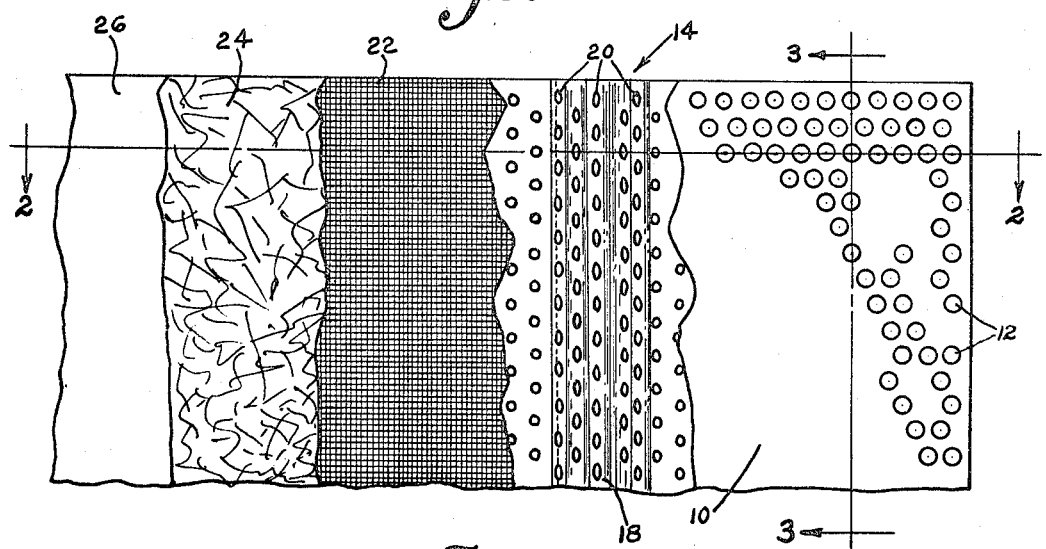
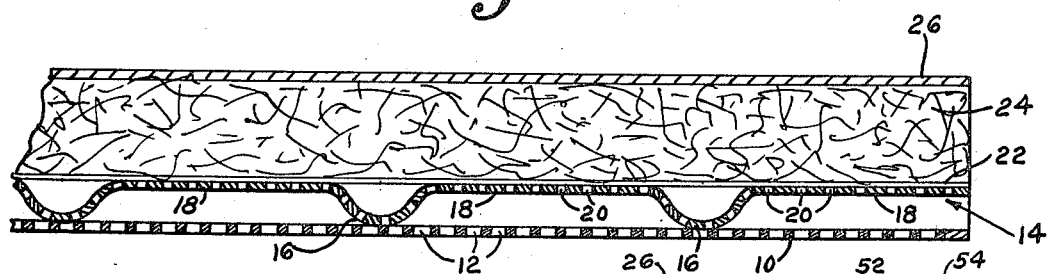
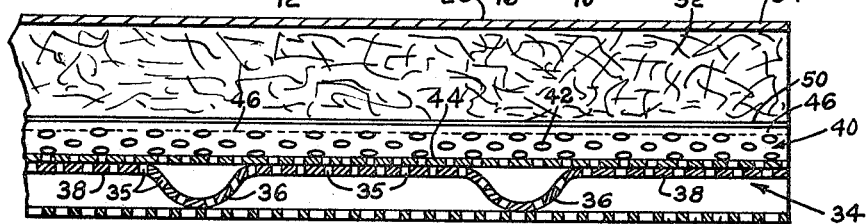
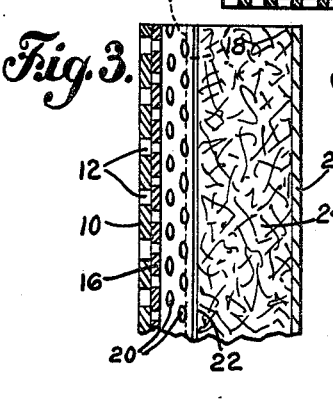
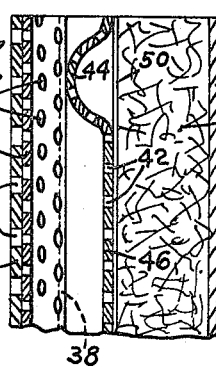
INVENTOR.
Oliver C. Eckel
BY Harold E. Cole
Attorney

United States Patent Office 3,384,199
Patented May 21, 1968

3,384,199
ACOUSTICAL CONTROL APPARATUS
Oliver C. Eckel, 111 Rolling Lane,
Carlisle, Mass. 01741
Filed Aug. 13, 1965, Ser. No. 479,508
3 Claims. (Cl. 181—33)

ABSTRACT OF THE DISCLOSURE

Acoustical control apparatus for use in acoustical test cells to impede the flow of high velocity gases before reaching sound absorbing material. A perforated outer support has relatively long flat portions between which are relatively short projecting ridges which latter are next to the outer member to thereby substantially space said material from the outer member.

---

One object of my invention is to provide such apparatus that will impede the flow of high velocity gases before they reach sound absorbing material and to accomplish this with the minimum amount of material.

Another object is to provide an impedance panel that resists the erosive action of high velocity gas flow on sound absorbing material by providing a surface portion that is in contact with sound absorbing material (except for a screen retainer between) and incorporating ridges in said panel that provide means for spacing the latter from an outer supporting member.

Another object is to provide a multiple number of said spacer panels at right angles to, and spaced from, each other as well as from adjoining members, to thereby provide further erosion resistance for acoustical insulation, from every high velocity gas flow.

A further object is to provide such apparatus the parts of which are simple to manufacture and assemble.

The foregoing and other objects which will appear as the nature of the invention is better understood, may be accomplished by a construction, combination and arrangement such as is disclosed by the drawing. The nature of the invention is such as to render it susceptible to various changes and modifications, and therefore, I am not to be limited to the construction disclosed by the drawing, nor to the particular parts described in the specification; but am entitled to all such changes therefrom as fall within the scope of my claims.

In the drawing:

FIG. 1 is a front elevational view of my acoustical control apparatus, broken away to show different parts uncovered.

FIG. 2 is a sectional view taken on the line 2—2 of FIG. 1.

FIG. 3 is a sectional view taken on the line 3—3 of FIG. 1.

FIG. 4 is a sectional view similar to FIG. 2, but of a modified form of my invention.

FIG. 5 is a sectional view similar to FIG. 3, but of the modified form shown in FIG. 4.

As illustrated, my acoustical apparatus has an assembly to impede flow of high velocity gases, and which has, as shown, an outer supporting member 10, shown as a metal sheet, having perforations 12 therein. For instance, this sheet may be 10 gauge with said perforations $\frac{3}{16}$-inch in diameter which permit the flow of sound therethrough and impede the flow of gases.

Inwardly of said supporting member in position of use, is an irregular impedance panel 14 having projecting or ridge portions 16 and non-projecting portions 18 inwardly thereof and which are preferably flat, as shown. Said flat portions 18 preferably exceed said projecting portions 16 in length as, for instance, the latter may measure 3 inches while said projecting portions may measure 1 inch, although these measurements may vary greatly as well as their relative proportions. Said panel 14 has perforations 20 therethrough that may be $\frac{1}{8}$-inch in diameter, for instance, preferably being smaller than said outer support perforations 12 and usually not in alinement therewith.

Next to said panel 14 is an intermediate, retainer member 22 such as a screen or wire mesh which contacts said panel flat portions 18 and retains material 24, later described in predetermined position.

Next to said retainer member 22 is sound absorptive material 24 such as fiber glass commonly enveloped in fiber glass cloth, not shown. This material is usually of greater thickness or depth than the thickness of the foregoing velocity impedance members. Since the velocity of gases is substantially reduced by the foregoing impedance members this material 24 stays serviceable for a long period because of previous reduction of the erosive effect of said high velocity gases. Said retainer member 22 and said material 24 constitute a unitary sound absorptive member.

Inwardly of said material 24 an inner support 26 is commonly provided which may be a solid sheet, since it often lies against a wall, ceiling, floor or the like. If an air space is provided inwardly thereof it may be perforated.

In FIGS. 4 and 5 I show a modified form of acoustical apparatus having an outer supporting member 30 similar to member 10 with perforations 32 therethrough. Inwardly thereof is an impedance panel 34 similar to panel 14 and with perforations 35, and having ridge portions 36 and non-projecting or flat portions 38. Next to said panel 34 is another similar impedance panel 40 extending at right angles thereto having perforations 42 therethrough, and having ridge portions 44 and non-projecting or flat portions 46.

Next to said panel 40 is a retainer member 50, next to which is sound wave absorptive material 52 similar to material 24. Inwardly of material 52 is an inner support 54 similar to support 26 which may lie against a wall, ceiling, floor or the like.

What I claim is:

1. Acoustical control apparatus comprising an outer supporting member having perforations therethrough, sound absorption means spaced inwardly from said outer member, and a rigid panel between said outer member and said means having perforations therethrough, said panel embodying flat portions adjoining said means, and ridge portions between and projecting outwardly from said flat portions, said ridge portions immediately adjoining said outer member to thereby space said flat portions from said outer member, said flat portions exceeding said ridge portions in length.

2. Acoustical control apparatus as set forth in claim 1, said flat portions constituting at least three times the linear length of said ridge portions.

3. Acoustical control apparatus as set forth in claim 1, and another rigid panel having perforations therethrough and immediately adjoining the first-mentioned panel and embodying flat portions and ridge portions between and projecting from said latter flat portions, said other panel ridge portions extending at right angles to said ridge portions of the first-mentioned panel, the flat portions of said other panel exceeding the latter's said ridge portions in length.

References Cited

UNITED STATES PATENTS

| | | | |
|---|---|---|---|
| 2,043,988 | 6/1936 | Brown | 181—33 |
| 2,826,261 | 3/1958 | Eckel | 181—33 |
| 2,915,135 | 12/1959 | Lemmerman | 181—33 |
| 3,011,584 | 12/1961 | Lemmerman et al. | 181—33 |
| 3,166,149 | 1/1965 | Hulse et al. | 181—33 |
| 3,263,771 | 8/1966 | Seifert | 181—33 |

FOREIGN PATENTS

| | | |
|---|---|---|
| 222,770 | 7/1959 | Australia. |
| 1,121,259 | 4/1956 | France. |

ROBERT S. WARD, Jr., *Primary Examiner.*